United States Patent
Yang (10) Patent No.: US 12,256,323 B2
(45) Date of Patent: Mar. 18, 2025

(54) NETWORK SELECTION METHOD, NETWORK CONNECTION METHOD, TERMINAL, AND STORAGE MEDIUM

(71) Applicant: ZTE CORPORATION, Shenzhen (CN)

(72) Inventor: Haicheng Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 351 days.

(21) Appl. No.: 17/759,884

(22) PCT Filed: Apr. 20, 2021

(86) PCT No.: PCT/CN2021/088346
§ 371 (c)(1),
(2) Date: Aug. 1, 2022

(87) PCT Pub. No.: WO2021/213369
PCT Pub. Date: Oct. 28, 2021

(65) Prior Publication Data
US 2023/0081061 A1      Mar. 16, 2023

(30) Foreign Application Priority Data

Apr. 21, 2020  (CN) .......................... 202010315562.0

(51) Int. Cl.
| H04W 48/18 | (2009.01) |
| H04W 40/24 | (2009.01) |
| H04W 48/16 | (2009.01) |
| H04W 76/10 | (2018.01) |

(52) U.S. Cl.
CPC ......... *H04W 48/18* (2013.01); *H04W 40/248* (2013.01); *H04W 48/16* (2013.01); *H04W 76/10* (2018.02)

(58) Field of Classification Search
CPC ... H04W 48/18; H04W 40/248; H04W 48/16; H04W 76/10
See application file for complete search history.

(56) References Cited

U.S. PATENT DOCUMENTS

| 10,602,422 B1 | 3/2020 | Jagannatha et al. |
| 2017/0367036 A1 | 12/2017 | Chen et al. |

(Continued)

FOREIGN PATENT DOCUMENTS

| CN | 107040481 A | 8/2017 |
| CN | 108432185 A | 8/2018 |

(Continued)

OTHER PUBLICATIONS

International Searching Authority. International Search Report and Written Opinion for PCT Application No. PCT/CN2021/088346 and English translation, mailed Jul. 8, 2021, pp. 1-15.

(Continued)

*Primary Examiner* — Diane D Mizrahi
(74) *Attorney, Agent, or Firm* — Vivacqua Crane, PLLC (57) ABSTRACT

A network selection method, a network connection method, a terminal device, and a non-transitory computer-readable storage medium are disclosed. The method may include: acquiring characteristic state information of the application (S1100); generating a network slice selection instruction according to the characteristic state information (S1200); and sending the network slice selection instruction to cause a terminal device to establish a corresponding network connection according to the network slice selection instruction (S1300).

13 Claims, 5 Drawing Sheets

(56) References Cited

U.S. PATENT DOCUMENTS

2018/0310238 A1  10/2018  Opsenica et al.
2019/0230556 A1* 7/2019  Lee .................. H04W 28/16

FOREIGN PATENT DOCUMENTS

| | | | |
|---|---|---|---|
| CN | 108632945 A | 10/2018 | |
| CN | 109391648 A | 2/2019 | |
| CN | 109429277 A | 3/2019 | |
| CN | 109547227 A | 3/2019 | |
| CN | 110266545 A | 9/2019 | |
| CN | 110324284 A | 10/2019 | |
| CN | 110383896 A | 10/2019 | |
| CN | 112350847 A | 2/2021 | |
| EP | 3547747 A1 | 10/2019 | |
| EP | 3648437 A1 | 5/2020 | |
| WO | 2019024604 A1 | 2/2019 | |
| WO | 2019174115 A1 | 9/2019 | |
| WO | 2019192692 A1 | 10/2019 | |

OTHER PUBLICATIONS

The State Intellectual Property Office of People's Republic of China. Decision on Rejection for CN Application No. 202010315562.0 and English translation, mailed Sep. 8, 2021, pp. 1-25.

The State Intellectual Property Office of People's Republic of China. First Office Action for CN Application No. 202010315562.0 and English translation, pp. 1-26.

The State Intellectual Property Office of People's Republic of China. First Search Report for CN Application No. 2020103155620 and English translation, mailed Mar. 17, 2021, pp. 1-3.

The State Intellectual Property Office of People's Republic of China. Fourth Office Action for CN Application No. 202010315562.0 and English translation, pp. 1-8.

The State Intellectual Property Office of People's Republic of China. Second Office Action for CN Application No. 202010315562.0 and English translation, pp. 1-19.

The State Intellectual Property Office of People's Republic of China. Supplemental Search Report for CN Application No. 202010315562.0 and English translation, pp. 1-2.

The State Intellectual Property Office of People's Republic of China. Third Office Action for CN Application No. 202010315562.0 and English translation, pp. 1-21.

3GPP System Architecture and Services. "Update of solution 11," 3GPP SA WG2 Meeting #127-bis, 2018, pp. 1-8.

3GPP System Architecture and Services. "User preference has higher priority than NSSP in URSP when UE selects the S-NSSAI for PDU Session Establishment," 3GPP SA WG2 Meeting #127, Apr. 2018, pp. 1-4.

European Patent Office. Extended European Search Report for EP Application No. 21791854.9, mailed May 30, 2023, pp. 1-13.

* cited by examiner

NETWORK SELECTION METHOD, NETWORK CONNECTION METHOD, TERMINAL, AND STORAGE MEDIUM

CROSS-REFERENCE TO RELATED APPLICATION

This application is a national stage filing under 35 U.S.C. § 371 of international application number PCT/CN2021/088346, filed on Apr. 20, 2021, which claims priority to Chinese patent application No. 202010315562.0 filed on Apr. 21, 2020. The contents of these applications are incorporated herein by reference in their entirety.

TECHNICAL FIELD

The embodiments of the present disclosure relate to, but are not limited to, the technical field of data transmission, in particular to a network selection method, a network connection method, a terminal device and a non-transitory computer-readable storage medium.

BACKGROUND

Network slicing is an on-demand networking method, which can result in multiple virtual end-to-end networks on a unified infrastructure to meet requirements in various network environments. For example, the 5G network slicing technology provides isolated network environments for different application scenarios by virtualizing independent logical networks on the same network infrastructure, so that different application scenarios can customize network functions and characteristics as needed.

In this field, for some cases, the selection of network slices is mainly performed on a network side, which makes it impossible for user equipment to dynamically select different network slices according to different requirements of application programs, resulting in poor flexibility and accuracy of network slice selection, and thus poor user experience.

SUMMARY

The embodiments of the present disclosure provide a network selection method, a network connection method, a terminal device and a non-transitory computer-readable storage medium.

An embodiment in accordance with an aspect of the present disclosure provides a network selection method for an application, which may include: acquiring characteristic state information of the application; generating a network slice selection instruction according to the characteristic state information; and sending the network slice selection instruction to cause a terminal device to establish a corresponding network connection according to the network slice selection instruction.

An embodiment in accordance with another aspect of the present disclosure provides a network connection method for a terminal device, which may include: acquiring a network slice selection instruction from an application, where the network slice selection instruction is generated according to characteristic state information of the application, the characteristic state information including at least one of: a service type, a user type, or updated slice information; and establishing a corresponding network connection according to the network slice selection instruction.

An embodiment in accordance with another aspect of the present disclosure provides a terminal device, which may include: a memory, a processor, and a computer program stored in the memory and executable by the processor, where the processor, when executing the computer program, implements: the network selection method for an application; or, the network connection method for a terminal device.

An embodiment in accordance with another aspect of the present disclosure provides a non-transitory computer-readable storage medium storing computer-executable instructions, where the computer-executable instructions are configured to perform: the network selection method for an application; or, the network connection method for a terminal device.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It should be noted that although a functional module division is shown in the schematic diagrams of the device and a logical order is shown in the flowcharts, the steps shown or described may be performed, in some cases, in a different module division from that of the device or in a different order from that in the flowcharts. The terms "first", "second", etc. in the description, the claims and the above-mentioned drawings are intended to distinguish similar objects and are not necessarily to describe a specific order or sequence.

In this field, for some cases, a terminal device acquires current network slice list information from a network device, selects and connects to a target slice from the current network slice list information, so that all services of all application programs are transmitted through the same network slice, resulting in poor flexibility and accuracy of network slice selection. Services with different network speed requirements, such as video call, application notification, and system upgrade, being transmitted at the same network speed through the same network slice, will not only waste communication resources, but also affect user experience.

On this basis, this embodiment provides a network selection method, a connection method, a terminal device and a storage medium, which can realize flexible and accurate network slice selection according to actual requirements of application programs, thereby effectively improving the network using experience for users.

It should be noted that in the following various embodiments, the terminal device may be a mobile terminal device or a non-mobile terminal device. The mobile terminal device may be a mobile phone, a tablet computer, a notebook computer, a palm computer, a vehicle-mounted terminal device, a wearable device, a super mobile personal computer, a netbook or a personal digital assistant, etc. The non-mobile terminal device may be a personal computer, a television, a teller machine or a self-service machine, etc. The terminal device has a network slice (such as 5G network slice) connection function. The terminal device can communicate with a network side device (such as base station) through a network slice to realize data transmission.

An input apparatus of the terminal device may be a common input apparatus such as touch screen, mouse and keyboard, or an intelligent input apparatus such as visual sensor and sound sensor. A corresponding user operation instruction can be obtained by analyzing user's operation on the input apparatus such as touch screen, mouse and keyboard. A corresponding user operation instruction can also be obtained by analyzing images, sounds and other information using image recognition, speech recognition and other algorithms. User operation may be touching or clicking a trigger entry of a display interface of a first terminal device.

In the following various embodiments, the terminal device is equipped with at least one application program (such as video playing application program and map application program) and a network connection module configured to realize network slice connection.

In accordance with an aspect of the present disclosure, an embodiment provides a flowchart of a network selection method for an application program.

Figure 1:
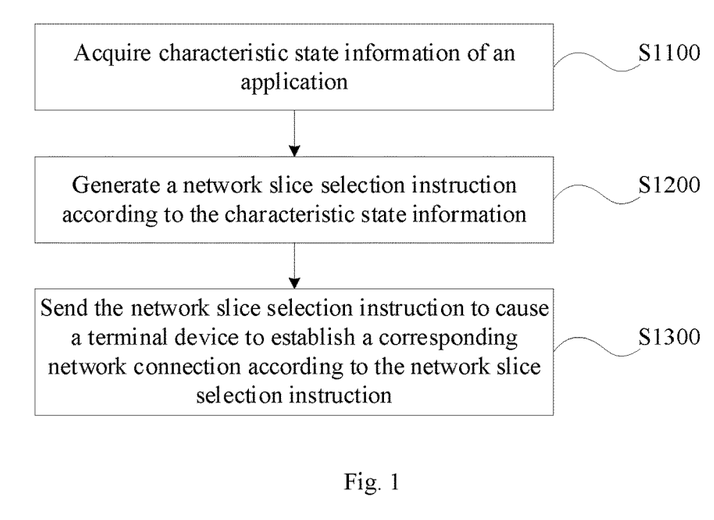
FIG. 1 is a flowchart of a network selection method for an application provided by an embodiment of the present disclosure.

Referring to FIG. 1, in some embodiments, the network selection method includes the following steps.

At S1100, characteristic state information of the application is acquired.

At S1200, a network slice selection instruction is generated according to the characteristic state information.

At S1300, the network slice selection instruction is sent to cause a terminal device to establish a corresponding network connection according to the network slice selection instruction.

In an illustrative implementation, the characteristic state information in S1100 may correspond to different network selection requirements of the application, and the characteristic state information may be a current service type, a user type, updated slice information or service life information of a specific network slice (such as activation or expiration of a purchased network slice) of the application. That is, the characteristic state information corresponds to a current service type state, a current user type state, and a network environment state of the application. In the following description, a service type, a user type and updated slice information are each taken as the characteristic state information.

In an illustrative implementation, the characteristic state information in S1100 includes a service type. The service type of the application can be determined by obtaining the user operation instruction, for example, the current service type of the application can be determined by obtaining an operation instruction input to the application by a user through a touch screen, a keypad or voice input. The service type can also be obtained by other means. According to back-end server connection state information corresponding to the user operation instruction, the service type selected by a user is determined. Here, the service type includes but is not limited to: automatic driving service, video call service, live streaming service, video download service, video streaming service, etc. For example, a video playing application may have a live streaming usage mode, a video download usage mode, etc., then the live streaming usage mode corresponds to the live streaming service, and the video download mode corresponds to the video download service. A map application may have a search usage mode and a navigation usage mode, then the search usage mode corresponds to a search service, and the navigation mode corresponds to a navigation service.

In an illustrative implementation, in S1200, the application can generate a corresponding network slice selection instruction according to the acquired service type and send it to the terminal device to cause the terminal device to establish a corresponding network connection according to the network slice selection instruction. For example, for the live streaming service and the automatic driving service which require low latency, a low-latency network slice A is selected to establish a network connection for transmission, and for high-speed download services such as the video download service and the video streaming service, a high-bandwidth network slice B is selected to establish a network connection for transmission.

By service segmentation and selecting different network slices for different service types, waste of communication resources is avoided, and network slices can be selected flexibly and accurately, so as to enhance user experience. Because the acquisition of the service type is initiated by the application, instead of through packet capture, the current service type can be accurately obtained, which is conducive to the segmentation of network slices corresponding to different service types of the application.

In an illustrative implementation, according to S1100 and S1200, the application generates the network slice selection instruction by acquiring the characteristic state information of the application, such as the user type. For example, the user type, such as unregistered users, ordinary users and important users, which is not limited here, can be determined by means of user identity information (e.g., user account) of the application. The purpose of obtaining the user type is to classify users and facilitate service segmentation.

The application can generate a corresponding network slice selection instruction according to the acquired user type and send it to the terminal device to cause the terminal device to establish a corresponding network connection according to the network slice selection instruction. For example, an operator of the application can purchase high-speed network slices (such as high-speed network slices featuring high bandwidth and low latency) provided by network operators for important users, and provide corresponding network slices for each type of users, so as to realize service segmentation and precisely improve user experience.

In an illustrative implementation, according to S1100 and S1200, the application generates the network slice selection instruction by acquiring the characteristic state information of the application, such as the updated slice information. For example, when a geographical location of the terminal device changes, the user equipment route selection policy (URSP) rules available on the network side will also be updated. After obtaining a URSP rule list, the application obtains the updated slice information according to the updated URSP rule list, and then generates a network slice selection instruction based on the updated slice information and sends the network slice selection instruction to the terminal device to cause the terminal device to establish a corresponding network connection according to the network slice selection instruction.

For example, when a user moves to areas like a concert, airport, or campus, the network side may provide special URSP rules for these specific areas to reduce network traffic charges or ensure the current network speed, or when a 5G network where a terminal device resides changes due to the location change of the terminal device, the network side can provide network slices with a higher download speed or lower latency or other available network slices, and then the application selects a network slice corresponding to the updated URSP rules on the network side for data transmission according to the obtained URSP rule list. In this way, network traffic charges are reduced, or more personalized services are provided to users.

In an illustrative implementation, the characteristic state information may also be other information of the application, for example, service life information of a specific network slice. If a purchased network slice expires, time information can be obtained through the application to generate a network slice selection instruction to cause the terminal device to cut off a current network slice connection and establish a new network slice connection according to the network slice selection instruction.

The network slice selection instruction can be generated according to the combination of the characteristic state information of the application. For example, for the same user type, different network slices may be adopted when different types of services are used, or after slice information is updated, different users can use different network slices, which allows the application to provide various types of services.

The network selection method for an application provided in this embodiment can realize flexible and accurate network slice selection according to actual requirements of applications, thereby effectively improving the network using experience for users.

In an illustrative implementation, the network slice selection instruction includes at least one of the following parameters: Data Network Name (DNN), Fully Qualified Domain Name (FQDN), Application Identifier (App ID), etc. The network slice selection instruction is used as an input parameter to match a corresponding network slice, so that the terminal device can obtain the corresponding network slice through subsequent table lookup mapping or calculation.

In some embodiments, A mapping relation table between characteristic state parameters and network slice selection instructions can be built in the application. After obtaining the characteristic state parameters of the application, the corresponding network slice selection instructions can be obtained according to the matching relation between the characteristic state parameters and the network slice selection instructions. For example, the mapping relation table can store the mapping relations between different characteristic state parameters and at least one of the following parameters: DNN, FQDN, App ID, etc.

For example, the application provides users with high-speed network access according to the user type, and further determines appropriate network slices according to service request information of users. If an important user requests a video call service and the network slice selection instruction corresponding to this characteristic state parameter is DNN==eMBB, the application sends the network slice selection information containing the DNN parameter, that is, the DNN parameter DNN==eMBB is sent, and a network slice which can provide the low-latency service is selected. If a user requests the video streaming service, the DNN parameter DNN==uRLLC is sent, and a network slice which can provide the high-speed download service is selected.

Alternatively, the application sends an FQDN of a server to instruct the terminal device to select a preset network slice in response to a destination address being the FQDN.

Alternatively, the application uses the App ID to instruct the terminal device to select a preset network slice for a preset application.

In an illustrative implementation, in response to the characteristic state information including the updated slice information, a flowchart of acquiring the characteristic state information of an application in S1100, which is shown in FIG. 1, specifically includes the following steps.

At S1110, a URSP rule list is acquired.

At S1120, updated slice information is obtained according to the URSP rule list.

At S1130, a network slice selection instruction is generated according to the updated slice information.

At S1140, the network slice selection instruction is sent.

That is, the application acquires a latest network slice state according to acquired updated URSP rules on the network side, generates a network slice selection instruction as needed, and sends the network slice selection instruction to the terminal device, and then the terminal device establishes a corresponding network connection according to the network slice selection instruction, so that the real-time network speed can be in a good communication state.

In an illustrative implementation, an operator of the application can purchase network slices from a network operator to provide users with higher-quality communication services. With this implementation, users can get excellent and smooth network acceleration experience.

In an illustrative implementation, in response to the characteristic state information including the updated slice information, the application generating a network slice selection instruction according to the characteristic state information includes the following steps.

At S1150, the updated slice information is displayed.

At S1160, a selection control instruction of a user for the updated slice information is received.

At S1170, a network slice selection instruction is generated according to the selection control instruction.

In an illustrative implementation, a switch mark or purchase mark is displayed on a user interface to indicate the updated slice information (corresponding to the updated URSP rules), and a selection control instruction for the updated URSP rules from the user is received. In response to the user choosing to apply for the URSP rules, a network slice selection instruction for applying for the updated URSP rules is generated and sent to the terminal device to realize network slice switching. In response to the user choosing to ignore the URSP rules, no change will be made. A network slice in accordance with an authorization range of a user can also be automatically selected for the user according to network slice selection authorization information provided by the user in advance, so that the user interface will not change, and the user can get excellent and smooth network acceleration experience. The authorization information can also be network slice usage rights corresponding to different user types.

Figure 2:
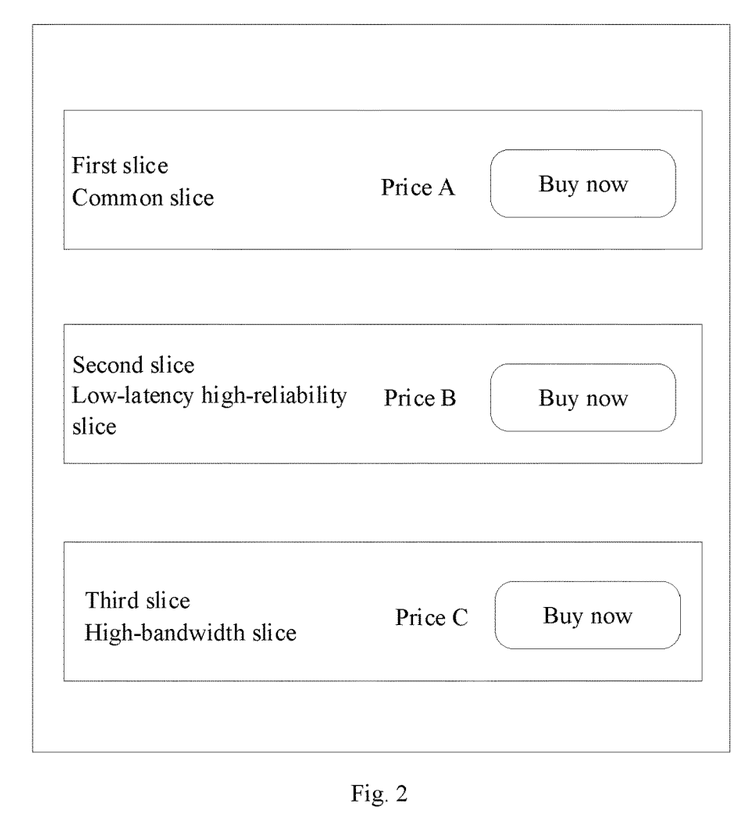
FIG. 2 is a schematic diagram of a user interface in a network selection method for an application provided by another embodiment of the present disclosure.

FIG. 2 is a schematic diagram of updated slice information displayed on a user interface. On the user interface, the updated slice information is shown, including a first slice, a second slice, and a third slice; and the performance (common slice, low-latency high-reliability slice, and high-bandwidth slice), the price (price A, price B, and price C), and corresponding control buttons (buy now button) of network slice are also displayed. When a selection control instruction of a user for a network slice corresponding to the updated slice information is received, such as a buy now instruction clicked by the user, in response to the selection control instruction being a buy now instruction, a network slice selection instruction is generated according to the selection control instruction. With this implementation, a terminal device user can also independently choose according to the current network situation whether to upgrade the network service, thereby improving user experience.

A network slice in accordance with an authorization range of a user can also be automatically selected for the user according to network slice selection authorization information provided by the user in advance, so that the user interface will not change, and the user can get excellent and smooth network acceleration experience. The authorization information can also be network slice usage rights corresponding to different user types.

In some application scenarios, the embodiment of the present disclosure can effectively realize network acceleration. Specifically, the embodiment not only can solve the problem that the network speed cannot be effectively improved in outdoor places, but also can accurately improve the network speed and reduce the network delay based on service types, specific user groups and specific areas of specific applications, so as to effectively improve user experience.

An embodiment in accordance with another aspect of the present disclosure provides a network connection method for a terminal device. According to the network connection method, the terminal device can flexibly and accurately select a network slice for an application according to received actual requirements of the application, thereby effectively improving the network using experience for users.

The network connection process for a terminal device will be described with the following specific embodiments.

Figure 3:
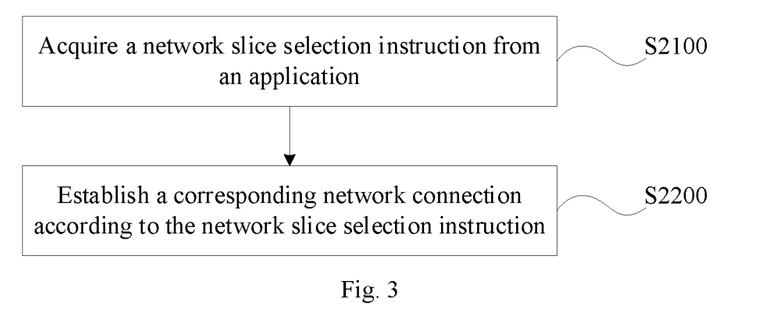
FIG. 3 is a flowchart of a network selection method for an application provided by another embodiment of the present disclosure.

FIG. 3 is a flowchart of a network connection method for a terminal device provided by an embodiment of the present disclosure, including the following steps.

At S2100, a network slice selection instruction from an application is acquired.

As described in the network selection method for an application in any of the above embodiments, a terminal device receives the network slice selection instruction sent by the application, where the network slice selection instruction is generated according to characteristic state information of the application, and the characteristic state information includes at least one of: a service type, a user type, or updated slice information. The application selects a network slice according to the current characteristic state information to generate the corresponding network slice selection instruction, which can accurately improve the network speed or reduce the network delay.

The terminal device includes entities or virtual units which can realize different functions. In the embodiment of the present disclosure, the application can be installed on the terminal device, and sends the network slice selection instruction by interacting with the terminal device to cause the terminal device to use the network slice selection instruction for subsequent network connection.

At S2200, a corresponding network connection is established according to the network slice selection instruction.

In an illustrative implementation, establishing a corresponding network connection according to the network slice selection instruction includes the following steps.

At S2210, a URSP rule list is acquired.

At S2220, the network slice selection instruction received by the terminal device is matched with the URSP rule list stored by the terminal device to obtain corresponding single network slice selection assistance information (S-NSSAI).

At S2230, the terminal device selects a network slice matched with the application according to the S-NSSAI to establish the corresponding network connection.

For example, in an illustrative implementation, the network slice selection instruction includes, but is not limited to, at least one of the following parameters: DNN, FQDN, or App ID. Here, the network slice selection instruction may use the parameters specified in the 3GPP specification or other parameters. For example, the network slice selection instruction can also use IP 3-tuple (IP three elements: destination IP address, destination port number, protocol type used by IP upper layer) parameters of 3GPP TS 23.503. The network slice selection instruction received by the terminal device is matched with the URSP rule list stored by the terminal device. The mapping relation between the network slice selection instruction and the network slice is recorded in the URSP rule list. By querying the URSP rule list, the corresponding S-NSSAI can be obtained through matching.

Each network slice includes S-NSSAI, that is, the application maps its current characteristic state information to the network slice selection instruction, so that the terminal device can select the S-NSSAI corresponding to the network parameter information according to the received network slice selection instruction, and then the terminal device can select the network slice matching the current characteristic state of the application according to the corresponding relation between the characteristic state information of the application and the S-NSSAI, and establish a network connection.

Figure 4:
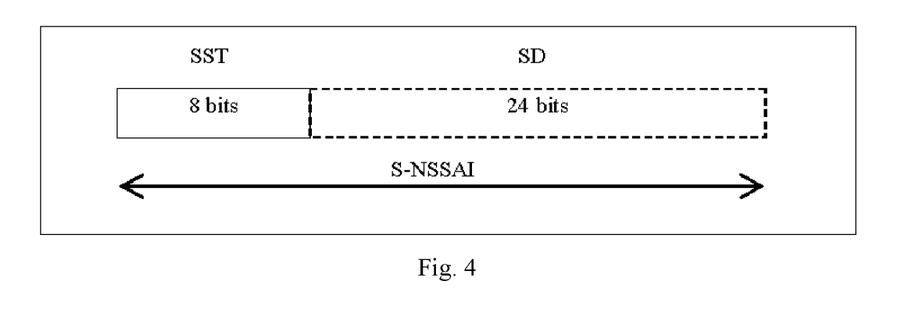
FIG. 4 is a schematic diagram of S-NSSAI in a network connection method for a terminal device provided by another embodiment of the present disclosure.

S-NSSAI is mainly used for identifying network slices. FIG. 4 is a schematic structure diagram of S-NSSAI, which includes two parts:

(1) Slice/Service type (SST): SST includes standardized and operator-defined types, where standardized types include: eMBB, uRLLC, and MIoT; and (2) Slice Differentiator (SD): SD is optional information used for supplementing SST to distinguish multiple network slices with the same SST.

Here, the length of SST is 1 byte (i.e. 8 bits), and the range of standardized SST values is: 0-127 (for example, eMBB, uRLLC, and mMTC mentioned above use three values within this range), and the range of operator-defined SST values is: 128-255. In addition, the operator-defined SST is only valid in an operating network provided by the corresponding operator, and the standardized SST is universal.

Table 1 shows several standardized SST values in some cases in this field.

| Name | Description | SST value |
|---|---|---|
| eMBB | Enhanced Mobile Broadband | 1 |
| uRLLC | Ultra Reliable and Low Latency Communication | 2 |
| mMTC | Massive Machine Type Communication | 3 |

Table 1 shows several common application scenarios of 5G at present, which are described as follows. (1) The eMBB scenario is mainly for applications like 4K/8K ultra-high definition videos, holographic technology, and augmented reality/virtual reality. The main demand of a mobile broadband is higher data capacity. The peak Internet access rate of intelligent terminal device users needs to reach 10 Gbit/s or even 20 Gbit/s, so as to enable large bandwidth applications such as virtual reality, ubiquitous live streaming and cloud access anytime and anywhere. (2) The uRLLC scenario is mainly used in fields like unmanned driving, automatic factories, and smart grids, which mainly require ultra-low latency and high reliability. The delay of a 5G network is required to reach 1 ms, so as to enable application in vertical industries, such as intelligent manufacturing, remote mechanical control, assisted driving, automatic driving and other low-delay services. (3) The mMTC (also known as mIoT) scenario is applied to mass sensors deployed in the fields of measurement, construction, agriculture, logistics, smart cities, homes, etc. These sensor devices are very dense, and most of them are static, requiring a 5G network to support large-scale connection which covers 1 million people and things per $km^2$.

In an illustrative implementation, According to the corresponding relation between the characteristic state information of the application and the S-NSSAI, the terminal device selects URSP rules from the URSP rule list stored in the terminal device to obtain a network slice (i.e. a network slice specified by the application) which can meet the current characteristic state of the application through matching. Then, a protocol data unit (PDU) session is generated according to the network slice, and a corresponding network connection is established. Here, the terminal device selects the corresponding network slice according to route selection policy information provided by the URSP rules to realize data transmission.

In an illustrative implementation, the terminal device selecting a network slice matched with the application according to the S-NSSAI to establish the corresponding network connection at S2230 includes the following steps.

At S2231, the terminal device establishes a PDU session according to the S-NSSAI.

At S2232, a network port and a route are configured for the network slice corresponding to the S-NSSAI according to the PDU session, so as to establish the corresponding network connection.

In an illustrative implementation, after establishing the PDU session for the application, data of the application are routed to the PDU session to realize the network connection, where the PDU session may be an existing PDU session or a newly established PDU session. After successfully matching the network slice, the terminal device determines whether to use an existing PDU session or create a new PDU session according to the S-NSSAI corresponding to the network slice obtained through matching.

In the above implementation, for an application, when the application conforms to a certain URSP rule of the terminal device, the terminal device routes the data of the application to the corresponding PDU session according to route selection parameters recorded in the URSP rule. In response to established PDU sessions of the terminal device including a PDU session which matches the selected route selection parameters, the terminal device can associate the application with the PDU session. In response to established PDU sessions of the terminal device not including a PDU session which matches the selected route selection parameters, the terminal device can establish a new PDU session according to the selected route selection parameters. In the process of establishing a new PDU session, the terminal device will carry S-NSSAI in a request for establishing a PDU session, indicating the desired network slice, so as to apply to the network side for establishing a PDU session, thus realizing a data service of the application.

It can be understood that after the terminal device establishes a PDU session for the application, a relevant network port and a relevant route need to be configured for the network slice specified by the application, so as to realize the network connection.

In an illustrative implementation, because the network side will update network slices provided by the terminal device, network elements on the network side will have updated URSP rules for the terminal device to use. For example, when a user is in a specific area like a concert, airport, or campus, the network side will provide dedicated network slices for these specific areas, or when a 5G network where a terminal device resides changes due to the location change of the terminal device, the network side can provide network slices with a higher download speed or lower latency or other available network slices.

In this case, the application can apply for updated network slices to obtain better network connection services. The method further includes the following steps.

At S2310, updated slice information and/or updated URSP rules from a network side are monitored.

At S2320, the updated slice information and/or updated URSP rules are sent to the application for the application to select a network slice according to the updated slice information and/or the updated URSP rules.

The method may further include the following steps.

At S2330, the updated URSP rules are stored into a URSP rule list.

In an illustrative implementation, the terminal device monitors the update state of URSP rules on the network side in a continuous manner or at a preset time interval to determine whether the network where the terminal device resides changes. In response to updated URSP rules existing on the network side, the terminal device stores the updated URSP rules on the network side in the URSP rule list of the terminal device, sends the update state of the URSP rules on the network side to the application, acquires a network slice selection instruction generated by the application according to the update state, and finds a matching network slice for the application from the URSP rule list according to the network slice selection instruction. A common problem in this field that the network speed cannot be effectively improved in outdoor places or other specific places is solved.

It can be understood that the URSP rule list stored in the terminal device includes default URSP rules of the terminal device and updated URSP rules on the network side, and the priority of the updated URSP rules on the network side is higher than that of the default URSP rules of the terminal device, so as to provide a better network connection for the terminal device.

For example, whether a packet control function (PCF) network element on the network side has a dedicated network slice for a specific area (i.e., new URSP rules) is monitored, and the updated URSP rules on the network side are stored in the URSP rule list of the terminal device if yes.

In an illustrative implementation, when determining that updated URSP rules exist on the network side by monitoring the PCF network element on the network side, the terminal device updates the local URSP rule list, and notifies each application of the updated USRP rule list, allowing each application to generate a network slice selection instruction according to the information of the updated URSP rule list, so as to obtain a better network connection effect and improve user experience.

For example, after receiving the notification about the updated URSP rule list sent by the terminal device, the application chooses to apply for the updated URSP rules based on the current characteristic state (such as a service type, a user type or a specific area), displays a switch mark or purchase mark on a user interface to instruct the user to select the updated URSP rules, and obtains an identifier trigger result of the user. In response to the user choosing to apply for the URSP rules, a network slice selection instruction for applying for the updated URSP rules is generated and sent to the terminal device to realize network slice switching. In response to the user choosing to ignore the URSP rules, no change will be made. A network slice in accordance with an authorization range of a user can also be automatically selected for the user according to network slice selection authorization information provided by the user in advance, so that the user interface will not change, and the user can get excellent and smooth network acceleration experience. The authorization information can also be network slice usage rights corresponding to different user types.

It can be understood that the form of displaying the switch mark or purchase mark on the user interface is not limited. The switch mark or purchase mark can be displayed to the user for selection simply by network slice performance description, price, network slice recommendation priority identifier, etc. For example, in the case of a slice store, information such as a list of available slicing services and purchased slicing services will be displayed to the user for selection.

In an illustrative implementation, after acquiring a network slice selection instruction from an application at S2100, the method further includes the following steps.

At S2110, identification information from an application is acquired.

At S2120, identity verification is performed on the application according to the identification information, and a corresponding network connection is established according to the network slice selection instruction and a result of the identity verification.

That is, a matching network slice for which the application applies is provided for the application based on the result of the identity verification, thus avoiding the situation that a network slice purchased by an application A is stolen by an application B. Here, the identification information of the application includes: number of application (such as App ID), package name of application, and signature of application, etc.

In an illustrative implementation, in the case that more than one applications need to run at the same time, such as in a split screen form or running in the background, the terminal device can concurrently receive multiple applications and generate corresponding network slice selection instructions according to their respective characteristic state information, and establish corresponding network connections for each application according to corresponding network slice selection instructions, so as to allow the services of multiple applications to run in a high-speed network connection state, enable more usage scenarios and enhance user experience.

In an illustrative implementation, an application can use its purchased network slice as a shared network slice, and share the network slice with other applications according to a preset sharing protocol. In this case, a participating application can choose the shared network slice according to its own characteristic state information for network connection, thus saving network traffic charges. For example, the preset sharing protocol may be: at least one application owned by the same application operator, or participating applications selected by different application operators according to preset sharing rates or sharing conditions, use their purchased network slices as shared network slices, so as to achieve the purpose of saving network traffic charges. For example, the sharing rate may be rent, the sharing condition may be that a sharing network slice library is formed through integration, and the sharing condition may be selected according to permission requirements, which are not limited here.

The above is the introduction of the network connection method for a terminal device in the embodiments of the present disclosure.

An embodiment in accordance with another aspect of the present disclosure further provides a network connection system, which is introduced below from the perspective of functional module implementation.

In practical application, a terminal device according to the embodiment of the present disclosure may be a handheld device with a wireless communication function, a vehicle-mounted device, a wearable device, a computing device or other processing devices connected to a wireless modem, as well as various forms of mobile stations, terminal devices, user equipment and Internet of Things devices. For example: the terminal device may be a virtual reality device applied in an eMBB scenario, an Internet of Things device with a sensor applied in an mMTC scenario, or a terminal device applied in a uRLLC scenario. The application may be installed on the terminal device and interact with the terminal device to realize corresponding functions.

Figure 5:
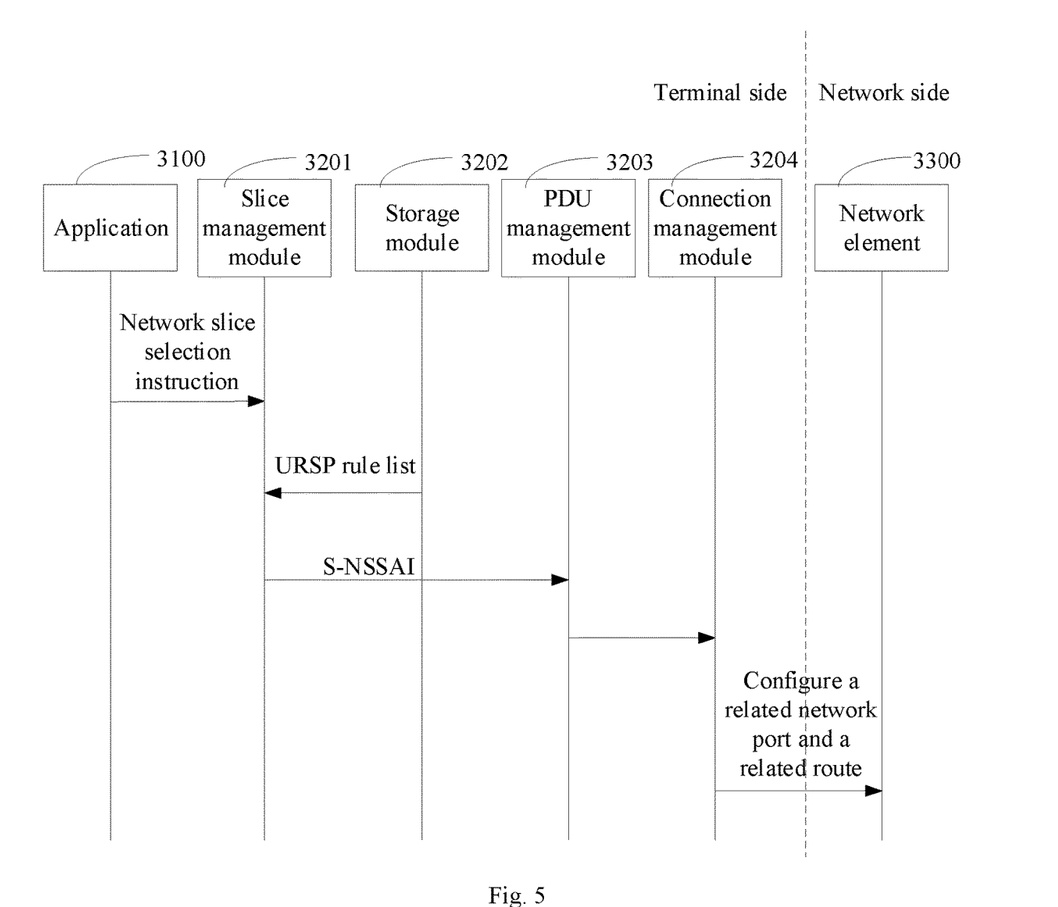
FIG. 5 is a schematic diagram of signal interaction in a network connection system provided by another embodiment of the present disclosure.

FIG. 5 is a schematic diagram of signal interaction in a network connection system of the embodiment of the present disclosure. The network connection system includes a terminal side and a network side; the terminal side includes: an application 3100, a slice management module 3201, a storage module 3202, a PDU management module 3203 and a connection management module 3204; and the network side includes a network element 3300.

In an illustrative implementation, the functions of the above modules are described as follows:

1) The application 3100 is configured to execute the network selection method for an application as described above, specifically including: acquiring characteristic state information of the application, where the characteristic state information includes at least one of: a service type, a user type, or updated slice information; generating a network slice selection instruction according to the characteristic state information; and sending the network slice selection instruction to cause a terminal device to establish a corresponding network connection according to the network slice selection instruction.

2) The slice management module 3201 is configured to execute the network connection method for a terminal device as described above, specifically including: acquiring a URSP rule list. The slice management module 3201 can obtain a URSP rule list from the storage module 3202. The received network slice selection instruction is matched with the URSP rule list stored in the terminal device to obtain corresponding S-NSSAI.

3) The storage module 3202 is configured to execute the network connection method for a terminal device as described above, specifically including: storing updated URSP rules into the URSP rule list.

4) The PDU management module 3203 is configured to execute the network connection method for a terminal device as described above, specifically including: establishing, by the terminal device, a PDU session according to the S-NSSAI.

5) The connection management module 3204 is configured to execute the network connection method for a terminal device as described above, specifically including: configuring a network port and a route for the network slice corresponding to the S-NSSAI according to the PDU session, so as to establish the corresponding network connection.

Here, the application 3100 sends the network slice selection instruction to the slice management module 3201, that is, the application 3100 generates the network slice selection instruction according to the characteristic state information and sends the network slice selection instruction to the slice management module 3201, and then the slice management module 3201 matches the network slice selection instruction with the URSP rule list stored in the storage module 3202 to obtain the S-NSSAI corresponding to the network slice specified by the application 3100. The PDU management module 3203 creates the PDU session for the application 3100 according to the S-NSSAI, and the connection management module 3204 configures the related network port and the related route for the network slice specified by the application 3100 according to the PDU session, so as to realize network connection with the network element 3300 on the network side for data interaction.

Here, besides creating a PUD session, the PDU management module 3203 is also configured to: maintain a PDU session, release a PDU session, etc. In an illustrative implementation, in response to the S-NSSAI corresponding to the network slice selected by the application 3100 conforming to a certain URSP rule of the terminal device, the terminal device routes the data of the application 3100 to the corresponding PDU session according to the route selection parameters recorded in the URSP rule. In the established PDU session of the current terminal device, in response to the existence of a PDU session which matches the selected route selection parameter, the terminal device can associate the application 3100 with the PDU session. In response to established PDU sessions of the terminal device not including a PDU session which matches the selected route selection parameters, the terminal device can establish a new PDU session according to the selected route selection parameters. In the process of establishing a new PDU session, the terminal device will carry S-NSSAI in a request for establishing a PDU session, indicating the desired network slice, so as to apply to the network side for establishing a PDU session, thus realizing a data service of the application 3100.

In other embodiments, the system further includes: an identity verification module 3205, a monitoring module 3206 and a notification module 3207.

In an illustrative implementation, the functions of the above modules are described as follows.

6) The identity verification module 3205 is configured to execute the steps in the network connection method as described above, specifically including: acquiring identification information from an application; and performing identity verification on the application according to the identification information, and establishing a corresponding network connection according to the network slice selection instruction and a result of the identity verification.

7) The monitoring module 3206 is configured to execute the steps in the network connection method as described above, specifically including: monitoring updated slice information and/or updated URSP rules from a network side; and sending the updated slice information and/or updated URSP rules to the application for the application to select a network slice according to the updated slice information and/or the updated URSP rules.

8) The notification module 3207 is configured to execute the steps in the network connection method as described above: when determining that updated URSP rules exist on the network side by monitoring the PCF network element on the network side, the terminal device updates the local URSP rule list, and notifies each application of the updated USRP rule list, allowing each application to generate a network slice selection instruction according to the information of the updated URSP rule list, so as to obtain a better network connection effect and improve user experience.

In an illustrative implementation, the identity verification module 3205 is configured to acquire identification information from the application 3100 and send the identification information to the slice management module 3201 after, before or while the slice management module 3201 receives the network slice selection instruction, so that the slice management module 3201 can perform identity verification on the application 3100 according to the identification information, and provide a matching network slice for which the application applies for the application based on the result of the identity verification, thus avoiding the situation that a network slice purchased by an application A is stolen by an application B. Here, the identification information of the application 3100 includes: number of application (such as App ID), package name of application, and signature of application, etc.

Because the network side will update network slices provided by the terminal device, network elements 3300 on the network side will have updated URSP rules for the terminal device to use. For example, when a user is in a specific area like a concert, airport, or campus, the network side will provide dedicated network slices for these specific areas, or when a 5G network where a terminal device resides changes due to the location change of the terminal device, the network side can provide network slices with a higher download speed or lower latency or other available network slices.

The monitoring module 3206 monitors the update state of URSP rules on the network side in a continuous manner or at a preset time interval to determine whether the network where the terminal device resides changes. In response to updated URSP rules existing on the network side, the new URSP rules are sent to the storage module 3202 for updating the URSP rule list stored in the storage module 3202. After the URSP rule list is updated, the notification module 3207 notifies each application 3100 of the updated USRP rule list, allowing each application 3100 to generate a network slice selection instruction according to the information of the updated URSP rule list, so as to obtain a better network connection effect and improve user experience.

In an illustrative implementation, the slice management module 3201, the storage module 3202, the PDU management module 3203, the connection management module 3204, the identity verification module 3205, the monitoring module 3206 and the notification module 3207 are located in the terminal device, and the application 3100 runs on the terminal device.

In another aspect, the application scenarios of the network connection system are described below through Example 1 and Example 2.

Example 1

Figure 6:
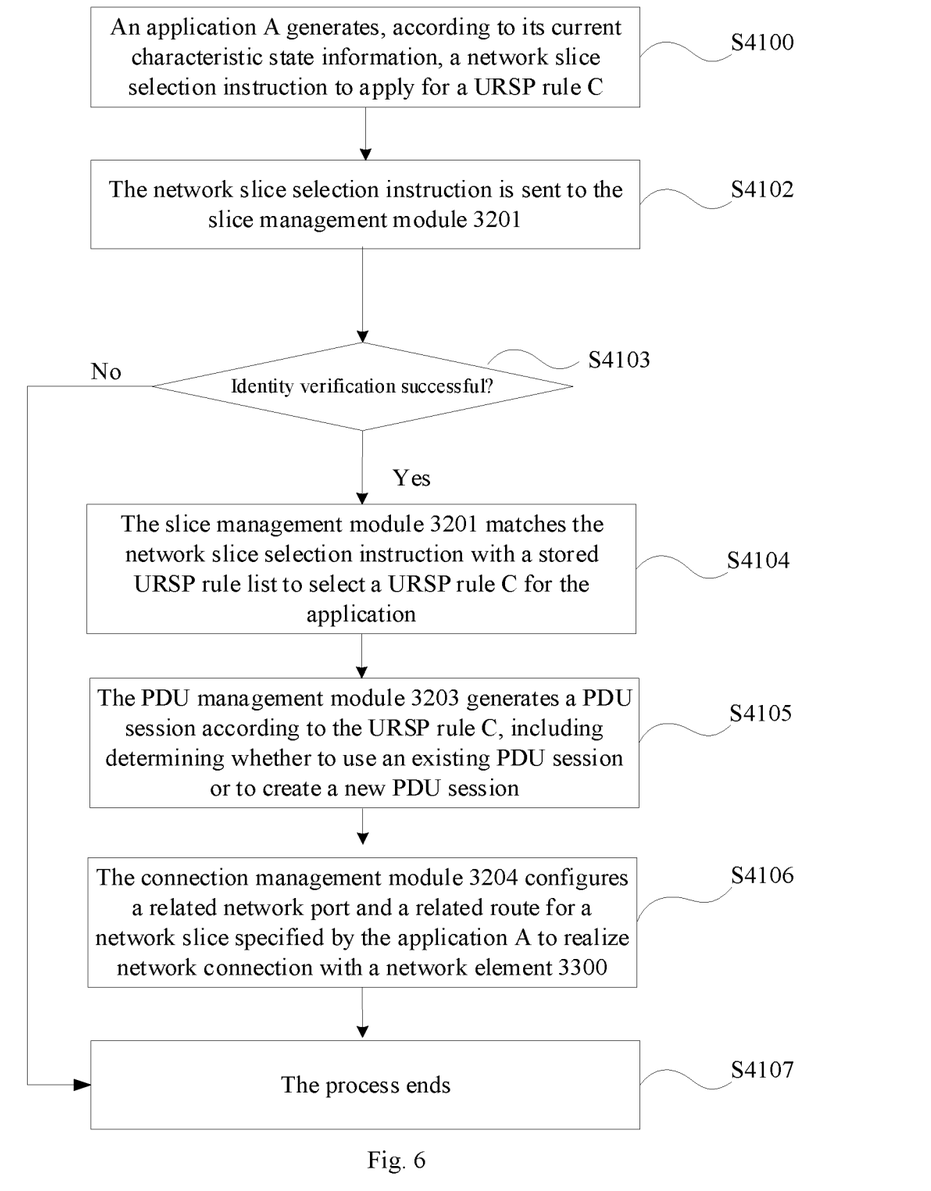
FIG. 6 is a flowchart of example 1 of a network connection method for a terminal device provided by an embodiment of the present disclosure.

FIG. 6 is a flowchart of Example 1, which includes the following steps.

At S4100, an application A generates, according to its current characteristic state information, a network slice selection instruction to apply for a URSP rule C.

At S4102, the network slice selection instruction is sent to the slice management module 3201.

At S4103, the identity verification module 3205 performs identity verification on the application A, and sends a result of the identity verification to the slice management module 3201, S4104 is performed in response to successful identity verification, otherwise the process ends.

At S4104, the slice management module 3201 matches the network slice selection instruction with the stored URSP rule list to select the URSP rule C for the application.

At S4105, the PDU management module 3203 generates a PDU session according to the URSP rule C, including determining whether to use an existing PDU session or create a new PDU session.

At S4106, the connection management module 3204 configures a related network port and a related route for the network slice specified by the application A to realize network connection with the network element 3300.

At S4107, the process ends.

Example 1 describes the process that an application generates a network slice selection instruction according to its current characteristic state information and sends the network slice selection instruction to the terminal device, and the terminal device establishes a corresponding network connection according to the network slice selection instruction.

Example 2 below describes the process of applying for updated URSP rules in a specific area, that is, applying for an updated network slice. Take a concert site as an example. After a user arrives at the concert site, a terminal device resides in the 5G network of the site.

At S4201, the monitoring module 3206 monitors and acquires an update state of a URSP rule of the network element 3300 on the network side, that is, acquires a dedicated URSP rule D of the network side in the specific concert site.

At S4202, the storage module 3202 stores the updated URSP rule in the URSP rule list of the terminal device.

At S4203, the notification module 3207 notifies each application of the updated URSP rule list, that is, notifies each application that a new URSP rule is available.

At S4204, after receiving the notification, the application B generates a network slice selection instruction for applying for the dedicated URSP rule D and sends the network slice selection instruction to the slice management module 3201 based on the current characteristic state information. In other examples, a network slice selection instruction is generated according to a selection intention of the user.

At S4205, the identity verification module 3205 acquires identification information of the application B, performs identity verification on the application B according to the identification information, and sends the result of the identity verification to the slice management module 3201. S4206 is performed in response to successful identity verification, otherwise the process ends.

At S4206, the slice management module 3201 matches the network slice selection instruction with the stored URSP rule list to select the dedicated URSP rule D for the application B.

At S4207, the PDU management module 3203 generates a PDU session according to the dedicated URSP rule D, including determining whether to use an existing PDU session or create a new PDU session.

At S4208, the connection management module 3204 configures a related network port and a related route for the network slice specified by the application B to realize network connection with the network element 3300.

At S4209, when the user leaves the specific concert site, the monitoring module 3206 finds out that the URSP rule of the network element 3300 on the network side changes.

At S4210, the storage module 3202 deletes the dedicated URSP rule D from the URSP rule list and updates the URSP rule list.

At S4211, the notification module 3207 notifies each application of the updated URSP rule list.

At S4212, after the application B receives the notification sent at S4211, the notification module 3207 instructs the PDU management module 3203 to release the PDU session generated for the dedicated URSP rule D.

At S4213, the process ends.

According to the scheme provided by the embodiment of the present disclosure, flexible and accurate network slice selection is at least realized according to actual requirements of applications, thereby effectively improving the network using experience for users. In some application scenarios, the embodiment of the present disclosure can effectively realize network acceleration. Specifically, the embodiment not only can solve the problem that the network speed cannot be effectively improved in outdoor places, but also can accurately improve the network speed and reduce the network delay based on service types, specific user groups and specific areas of specific applications, so as to effectively improve user experience.

Figure 7:
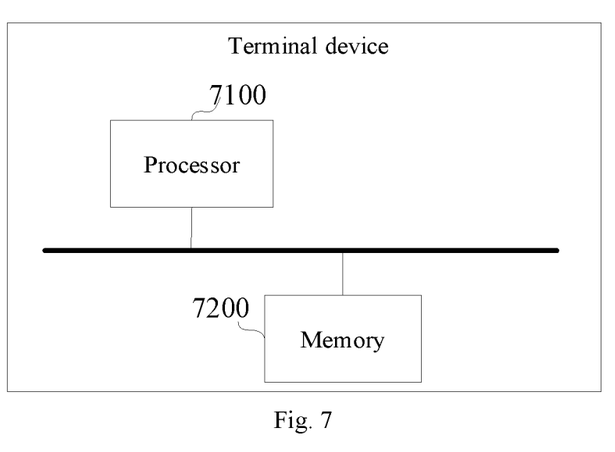
FIG. 7 is a schematic diagram of a terminal device provided by an embodiment of the present disclosure.

In accordance with another aspect, as shown in FIG. 7, an embodiment of the present disclosure further provides a terminal device, including: a memory 7100, a processor 7200, and a computer program stored in the memory 7100 and executable by the processor 7200, where the processor 7200, when executing the computer program, implements: the network selection method for an application according to any embodiment above; or, the network connection method for a terminal device according to any embodiment above.

An embodiment in accordance with another aspect of the present disclosure further provides a computer-readable storage medium storing computer-executable instructions, where the computer-executable instructions are configured to perform: the network selection method for an application according to any embodiment above; or, the network connection method for a terminal device according to any embodiment above.

The embodiment of the present disclosure includes: acquiring characteristic state information of the application; generating a network slice selection instruction according to the characteristic state information; and sending the network slice selection instruction to cause a terminal device to establish a corresponding network connection according to the network slice selection instruction. According to the scheme provided by the embodiment of the present disclosure, flexible and accurate network slice selection is at least realized according to actual requirements of applications, thereby effectively improving the network using experience for users.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

The above is a detailed description of some implementations of the present disclosure, but the present disclosure is not limited to the above-mentioned embodiments. Those having ordinary skill in the art can also make various equivalent modifications or replacements without departing from the principle of the present disclosure, and these equivalent modifications or replacements are all included in the scope defined by the claims of the present disclosure.

What is claimed is:

1. A network selection method for an application, comprising:
   acquiring characteristic state information of the application, wherein the characteristic state information comprises updated slice information,
   wherein the acquiring characteristic state information of the application comprises:
      acquiring an updated User Equipment Route Selection Policy (URSP) rule from a terminal device that monitors the updated URSP rule from a network side; and
      obtaining the updated slice information according to the updated URSP rule;
   generating a network slice selection instruction according to the characteristic state information; and
   sending the network slice selection instruction to cause the terminal device to establish a corresponding network connection according to the network slice selection instruction.

2. The network selection method of claim 1, wherein the characteristic state information further comprises at least one of:
   a service type, or
   a user type.

3. The network selection method of claim 2, wherein the network slice selection instruction comprises at least one of:
   Data Network Name (DNN),
   Fully Qualified Domain Name (FQDN), or
   Application Identifier (App ID).

4. The network selection method of claim 1, wherein the network slice selection instruction comprises at least one of:
   Data Network Name (DNN),
   Fully Qualified Domain Name (FQDN), or
   Application Identifier (App ID).

5. The network selection method of claim 1, wherein in response to the characteristic state information comprising the updated slice information, generating a network slice selection instruction according to the characteristic state information comprises:
   displaying the updated slice information;
   receiving a selection control instruction of a user for the updated slice information; and
   generating the network slice selection instruction according to the selection control instruction.

6. A network connection method for a terminal device, comprising:
   acquiring a network slice selection instruction from an application, wherein the network slice selection instruction is generated according to characteristic state information of the application, the characteristic state information comprising
   updated slice information; and
   establishing a corresponding network connection according to the network slice selection instruction;
   wherein the method further comprises:
   monitoring updated User Equipment Route Selection Policy (URSP) rules from a network side; and
   sending the updated URSP rules to the application for the application to select a network slice according to the updated URSP rules.

7. The network selection method of claim 6, wherein establishing a corresponding network connection according to the network slice selection instruction comprises:
   acquiring a User Equipment Route Selection Policy (URSP) rule list;
   matching the network slice selection instruction with the URSP rule list to obtain corresponding single network slice selection assistance information (S-NSSAI); and
   establishing a corresponding network connection according to the S-NSSAI.

8. The network selection method of claim 7, wherein establishing a corresponding network connection according to the S-NSSAI comprises:
- establishing a Protocol Data Unit (PDU) session according to the S-NSSAI; and
- configuring a network port and a route for a network slice corresponding to the S-NSSAI according to the PDU session, so as to establish the corresponding network connection.

9. The network selection method of claim 6, wherein establishing a corresponding network connection according to the network slice selection instruction comprises:
- acquiring identification information from the application;
- performing identity verification according to the identification information; and
- establishing the corresponding network connection according to the network slice selection instruction and a result of the identity verification.

10. The network selection method of claim 6, further comprising:
- storing the updated URSP rules into the URSP rule list.

11. A terminal device, comprising:
- a memory, a processor, and a computer program stored in the memory and executable by the processor, wherein the processor, when executing the program, implements a network selection method for an application comprising:
  - acquiring characteristic state information of the application, wherein the characteristic state information comprises updated slice information,
  - wherein the acquiring characteristic state information of the application comprises:
    - acquiring an updated User Equipment Route Selection Policy (URSP) rule from a terminal device that monitors the updated URSP rule from a network side; and
    - obtaining the updated slice information according to the updated URSP rule;
  - generating a network slice selection instruction according to the characteristic state information; and
  - sending the network slice selection instruction to cause the terminal device to establish a corresponding network connection according to the network slice selection instruction.

12. A non-transitory computer-readable storage medium storing computer-executable instructions, wherein the computer-executable instructions are configured to implement a network selection method for an application comprising:
- acquiring characteristic state information of the application, wherein the characteristic state information comprises updated slice information,
- wherein the acquiring characteristic state information of the application comprises:
  - acquiring an updated User Equipment Route Selection Policy (URSP) rule from a terminal device that monitors the updated URSP rule from a network side; and
  - obtaining the updated slice information according to the updated URSP rule;
- generating a network slice selection instruction according to the characteristic state information; and
- sending the network slice selection instruction to cause the terminal device to establish a corresponding network connection according to the network slice selection instruction.

13. A terminal device, comprising:
- a memory, a processor, and a computer program stored in the memory and executable by the processor, wherein the processor, when executing the program, implements a network connection method for a terminal device comprising:
  - acquiring a network slice selection instruction from an application, wherein the network slice selection instruction is generated according to characteristic state information of the application, the characteristic state information comprising updated slice information; and
  - establishing a corresponding network connection according to the network slice selection instruction;
  - wherein the method further comprises:
    - monitoring updated User Equipment Route Selection Policy (URSP) rules from a network side; and
    - sending the updated URSP rules to the application for the application to select a network slice according to the updated URSP rules.

* * * * *